(12) United States Patent
Frappé et al.

(10) Patent No.: US 12,620,923 B2
(45) Date of Patent: May 5, 2026

(54) VARIABLE SPEED DRIVE CONTROL

(71) Applicant: Schneider Toshiba Inverter Europe SAS, Pacy sur Eure (FR)

(72) Inventors: Emmanuel Frappé, Boulogne-Billancourt (FR); Thomas Devos, Carrières-sous-poissy (FR); Al Kassem Jebai, Vernon (FR); François Malrait, Jouy-sur-Eure (FR)

(73) Assignee: Schneider Toshiba Inverter Europe SAS, Pacy sur Eure (FR)

( * ) Notice: Subject to any disclaimer, the term of this patent is extended or adjusted under 35 U.S.C. 154(b) by 33 days.

(21) Appl. No.: 18/535,301

(22) Filed: Dec. 11, 2023

(65) Prior Publication Data

US 2024/0204707 A1     Jun. 20, 2024

(30) Foreign Application Priority Data

Dec. 16, 2022     (EP) ..................................... 22306903

(51) Int. Cl.

| | |
|---|---|
| *H02P 6/08* | (2016.01) |
| *H02P 21/14* | (2016.01) |
| *H02P 21/22* | (2016.01) |
| *H02P 23/14* | (2006.01) |
| *H02P 27/12* | (2006.01) |

(52) U.S. Cl.
CPC .............. *H02P 27/12* (2013.01); *H02P 21/14* (2013.01); *H02P 21/22* (2016.02); *H02P 23/14* (2013.01)

(58) Field of Classification Search
CPC .. H02P 21/22; H02P 27/12; H02P 6/08; H02P 23/14; H02P 21/14

USPC ......................................................... 318/798
See application file for complete search history.

(56) References Cited

U.S. PATENT DOCUMENTS

| | | | | |
|---|---|---|---|---|
| 8,378,603 B2 * | 2/2013 | Hasan | ..................... | H02P 21/22 |
| | | | | 318/432 |
| 10,483,894 B2 * | 11/2019 | Dixon | ..................... | H02P 23/14 |

(Continued)

FOREIGN PATENT DOCUMENTS

| | | |
|---|---|---|
| CN | 101087125 B | 5/2011 |
| CN | 208656661 U | 3/2019 |
| JP | 2015023641 A | 2/2015 |

OTHER PUBLICATIONS

European Search Report and Search Opinion dated Jun. 7, 2023 for corresponding European Patent Application No. EP22306903.0, 5 pages.

*Primary Examiner* — Gabriel Agared
(74) *Attorney, Agent, or Firm* — Wolf, Greenfield & Sacks, P.C.

(57)     ABSTRACT

Examples include a method for controlling a variable speed drive driving a three-phase electric motor. The method includes measuring current signals in the windings of the electric motor, and determining a current parameter associated to the electric motor based on the current signals. The current parameter includes either a current offset of at least one winding of the electric motor in relation to a zero-current value, or a current misbalance between windings of the electric motor. The method further includes determining an amended control law of the electric motor for decreasing the determined current parameter, and applying pulse width modulation signals on insulated gate bipolar transistors of the inverter based on the amended control law.

17 Claims, 5 Drawing Sheets

(56)  References Cited

U.S. PATENT DOCUMENTS

| | | | |
|---|---|---|---|
| 2011/0169438 A1* | 7/2011 | Hasan | H02P 21/22 |
| | | | 180/65.285 |
| 2014/0191699 A1* | 7/2014 | Dixon | H02P 21/05 |
| | | | 318/504 |
| 2015/0145459 A1* | 5/2015 | Guzelgunler | H02P 27/04 |
| | | | 318/490 |
| 2020/0072228 A1* | 3/2020 | Prine | H01F 30/12 |
| 2020/0136550 A1* | 4/2020 | Koenig | H02P 29/0243 |

* cited by examiner

VARIABLE SPEED DRIVE CONTROL

CROSS-REFERENCE TO RELATED APPLICATIONS

This patent claims priority under 35 U.S.C. § 119 to European Patent Application No. 22306903.0, filed on Dec. 16, 2022, and titled "VARIABLE SPEED DRIVE CONTROL."

FIELD OF THE INVENTION

This invention relates to a method for controlling a variable speed drive driving a three-phase electric motor.

BACKGROUND

Numerous electric motors connected to an electric network are driven by a variable speed drive. A variable speed drive allows modifying a frequency, amplitude and/or phase of an electric signal provided by an electric network in order to control an electric motor. The variable speed drive usually comprises a rectifier stage, a DC-link stage and an inverter stage.

The inverter stage may comprise six switches controlled using a pulse width modulation, PWM, function. The PWM function is determined based on a control law enabling to drive the electric motor at a desired operating point while seeking to balance the voltages applied on the different windings of the electric motor for reducing component aging and thermal problems of the electric motor.

The present description aims at improving operation of electric motor, in particular with regards to aging of components.

SUMMARY

An object of the present disclosure is to propose a method for controlling a variable speed drive driving a three-phase electric motor, the variable speed drive comprising a pulse width modulation, PWM, controller, an inverter and a DC-link adapted to supply the inverter with a significantly continuous voltage, wherein:

the inverter comprises three legs connected to the three windings of the electric motor, each leg being connected on one side to a positive bus of the significantly continuous voltage and on another side to a negative bus of the significantly continuous voltage, each leg comprising a top switch and a bottom switch; whereby each switch comprises two components, a first component being an Insulated Gate Bipolar Transistor, IGBT, controlled by a PWM signal emitted by the PWM controller based on a control law of the electric motor, and a second component being a freewheeling diode connected in parallel with the IGBT;

the method comprising:

measuring current signals in the windings of the electric motor;

determining a current parameter associated to the electric motor based on the current signals, wherein the current parameter comprises a current offset of at least one winding of the electric motor in relation to a zero-current value; or wherein the current parameter comprises a current misbalance between windings of the electric motor;

determining an amended control law of the electric motor for decreasing the determined current parameter; and applying PWM signals on the IGBTs of the inverter based on the amended control law.

The PWM signals applied based on an amended control law therefore allows reducing a current offset in relation to a zero-current of at least one winding of the electric motor or reducing a current misbalance between the windings of the electric motor. Reducing a current offset in relation to a zero-current value in a specific winding of an electric motor allows reducing inductance saturation probability of the specific winding of the electric motor, therefore reducing the torque ripple of the electric motor. Reducing a current misbalance between the windings of the electric motor allows mitigating the electric motor overheating and therefore reducing the electrical and/or mechanical damages induced by an undesired overheating.

Optionally, determining a current parameter comprises determining a current offset of at least one winding of the electric motor and a current misbalance between windings of the electric motor.

Optionally, determining the current misbalance between windings of the electric motor comprises:

determining the current offsets of the current signals in the windings of the electric motor; removing the current offsets from the current signals for obtaining centered current signals; and determining a reverse component of the measured current signals based on a current observer and on the centered current signals.

Optionally, the centered current signals are defined in the current observer as:

$$\hat{I}^1_{\alpha\beta} = \hat{I}^f e^{j\hat{\theta}} + (\hat{I}^r_1 + j\hat{I}^r_2)e^{-j\hat{\theta}}$$

wherein $$\hat{I}^1_{\alpha\beta}$$

corresponds to an estimation of the centered current signals $$I^1_{abc}$$

in the Clarke representation, wherein $\hat{\theta}$ corresponds to an estimation of the current vector angle in $\alpha\beta$ frame, wherein $\hat{I}^f e^{j\hat{\theta}}$ corresponds to an estimation of the forward component of the measured current signals, wherein $$(\hat{I}^r_1 + j\hat{I}^r_2)e^{-j\hat{\theta}}$$

corresponds to an estimation of the reverse component of the measured current signals, wherein $$\hat{I}^r_1$$

corresponds to an estimation of the real part of the reverse component of the measured current signals, and wherein $$\hat{I}_2^r$$

corresponds to an estimation of the imaginary part of the reverse component of the measured current signals;

wherein determining the reverse component of the measured current signals comprises determining the estimated real part $$\hat{I}_1^r$$

and imaginary part $$\hat{I}_2^r$$

of the reverse component of the measured current signals; and wherein the amended control law of the electric motor is determined for decreasing the estimated real part $$\hat{I}_1^r$$

and imaginary part $$\hat{I}_2^r$$

of the reverse component of the measured current signals.

Optionally, the current vector angle $\hat{\theta}$ in $\alpha\beta$ frame is estimated based on a Phase-Locked Loop, PLL, or is determined based on the magnetic flux vector angle of the electric motor determined by the variable speed drive.

Optionally, the estimated real part $$\hat{I}_1^r$$

and imaginary part $$\hat{I}_2^r$$

of the reverse component of the measured current signals $$\hat{I}_{\alpha\beta}^1$$

are estimated based on the following equation:

$$\frac{d}{dt}\begin{pmatrix}\hat{I}_{\alpha\beta}^f \\ \hat{I}_1^r \\ \hat{I}_2^r\end{pmatrix} =$$

$$K_p\left(\begin{pmatrix}\cos\hat{\theta} & \sin\hat{\theta} \\ \cos\hat{\theta} & -\sin\hat{\theta} \\ \sin\hat{\theta} & \cos\hat{\theta}\end{pmatrix}\begin{pmatrix}I_\alpha \\ I_\beta\end{pmatrix} - \begin{pmatrix}1 & \cos(2\hat{\theta}) & \sin(2\hat{\theta}) \\ \cos(2\hat{\theta}) & 1 & 0 \\ \sin(2\hat{\theta}) & 0 & 1\end{pmatrix}\begin{pmatrix}\hat{I}_{\alpha\beta}^f \\ \hat{I}_1^r \\ \hat{I}_2^r\end{pmatrix}\right)$$

wherein $$\hat{I}_{\alpha\beta}^f$$

corresponds to an estimation of the forward component of the measured current signals in the Clarke representation, wherein $$\hat{I}_1^r$$

corresponds to an estimation of the real part of the reverse component of the measured current signals, wherein $$\hat{I}_2^r$$

corresponds to an estimation of the imaginary part of the reverse component of the measured current signals, wherein $K_p=2\ \pi\ f_0$ with $f_0$ being the selected gain frequency, wherein $\hat{\theta}$ corresponds to an estimation of the current vector angle in $\alpha\beta$ frame, wherein $I_\alpha$ corresponds to the first component of the current in the Clarke representation determined based on the measured current signals in the windings, and wherein $I_\beta$ corresponds to the second component of the current in the Clarke representation determined based on the measured current signals in the windings.

Optionally, the current parameter comprises a current offset of each winding of the electric motor.

Optionally, the current parameter comprises a current offset of a specific winding of the electric motor and wherein determining a current offset of the specific winding comprises determining an average value of the current signal of the specific winding.

Optionally, the current parameter comprises a current offset of a specific winding of the electric motor and wherein determining a current offset of the specific winding comprises applying a digital low-pass filter on the measured current signal of the specific winding of the electric motor.

Optionally, determining an amended control law comprises determining a proportional factor and an integral factor of a proportional-integer, PI, regulator for canceling the determined current parameter.

Optionally, a transformer is disposed between the variable speed drive and the electric motor such that the variable speed drive drives the electric motor through the transformer.

The present disclosure also presents:

a computer-readable storage medium comprising instructions which, when executed by at least one controller, cause the at least one controller to carry out the method of any one of the methods hereby presented;

a computer program product comprising instructions which, when the program is executed by at least one controller, cause the computer to carry out any one of the methods hereby described; and a processing system comprising a variable speed drive and a pulse width modulation, PWM, controller; wherein the processing system is adapted to implement any one of the methods hereby described.

The example method according to the present disclosure therefore allows at least reducing inductance saturation probability of a specific winding of the electric motor, or reducing the torque ripple of the electric motor and the electrical and/or mechanical damages induced by an undesired overheating, and therefore allow reducing the component aging of the electric motor.

DETAILED DESCRIPTION

The disclosure applies to a method for controlling a variable speed drive driving an electric motor. An example of an electric circuit whereby the method could be applied is described below with reference to FIG. 1. In the electric circuit, the components represented by dotted lines are optional.

The electric circuit comprises an electric power source 2, a variable speed drive 3 and an electric motor 4.

The electric power source 2 may correspond to a battery supplying a direct voltage DC, or to an electric network supplying either an alternating voltage AC, or a direct voltage DC. The alternating voltage AC may for example comprise two or three phases. The power source 2 may, for example, be a three-phase electric network as illustrated in FIG. 1.

An electric motor 4 should be understood in this disclosure as any kind of electric motors which may be driven by a variable speed drive. The electric motor may be a synchronous or an asynchronous electric motor, for example a reluctance motor or a permanent magnet synchronous motor.

A variable speed drive 3 should be understood in this disclosure as an electronic, electrical, virtual or software implemented control unit for an electric motor. A variable speed drive may control an electric motor 4 using an electric or electronic command and in particular may apply a determined voltage to the motor.

Figure 1:
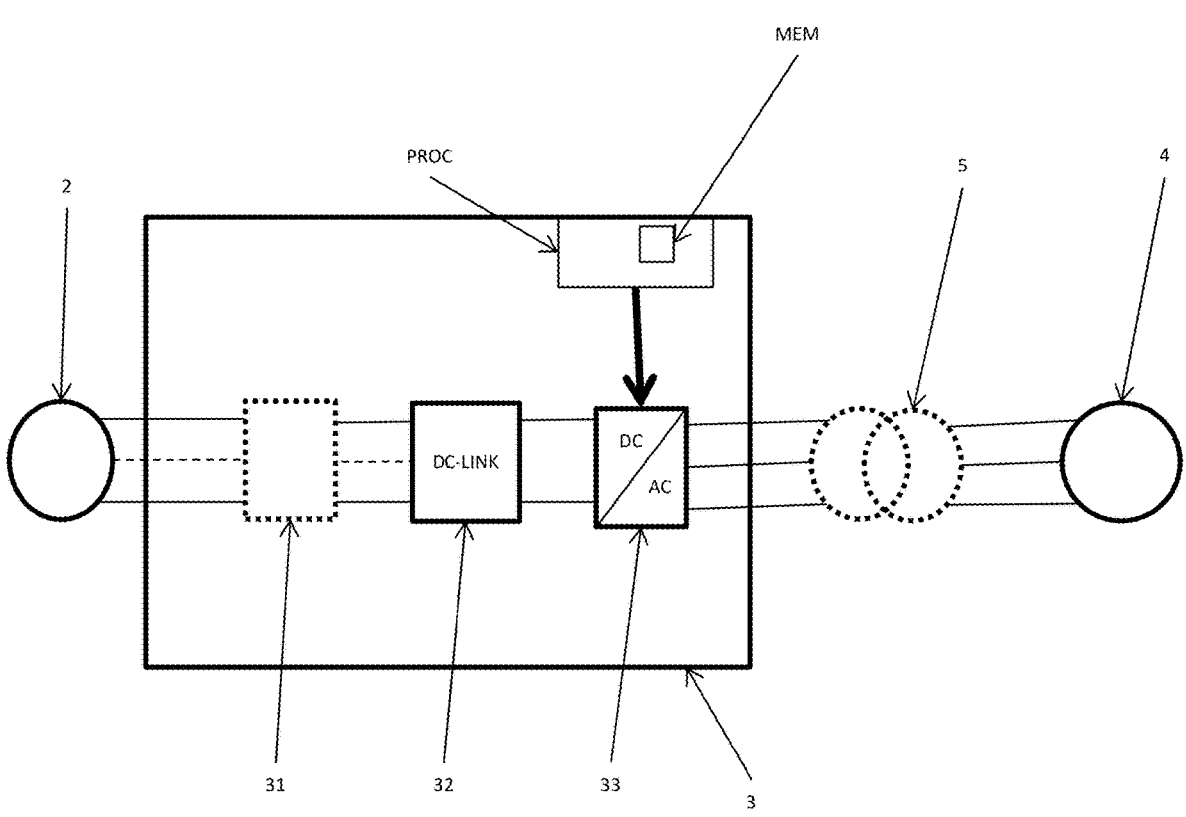
FIG. 1 illustrates an example of an electric circuit comprising a variable speed drive for controlling an electric motor.

In some examples, and as illustrated in FIG. 1, the variable speed drive may comprise a rectifier 31. The rectifier 31 is intended to convert an alternating voltage AC supplied by the power source 2 into a direct voltage DC. As the electric power source 2 may already supply a direct voltage DC, the rectifier 31 is an option as represented by the dotted lines in FIG. 1. In some examples, a rectifier 31 may be a diode rectifier for rectifying an alternating voltage supplied by the electric power source 2.

The variable speed drive 3 comprises a DC-link 32. The DC-link may be defined as a circuit configured to stabilize the voltage of a direct power bus, DC bus, supplying an inverter 33. The DC-link 32 is adapted to supply the inverter 33 with a significantly continuous voltage, The DC-link 32 is connected, in one side, either to the rectifier 31 when the variable speed drive comprises a rectifier 31, or to the electric power source 2, and in another side, to the inverter 33 as illustrated in FIG. 1.

Figure 2:
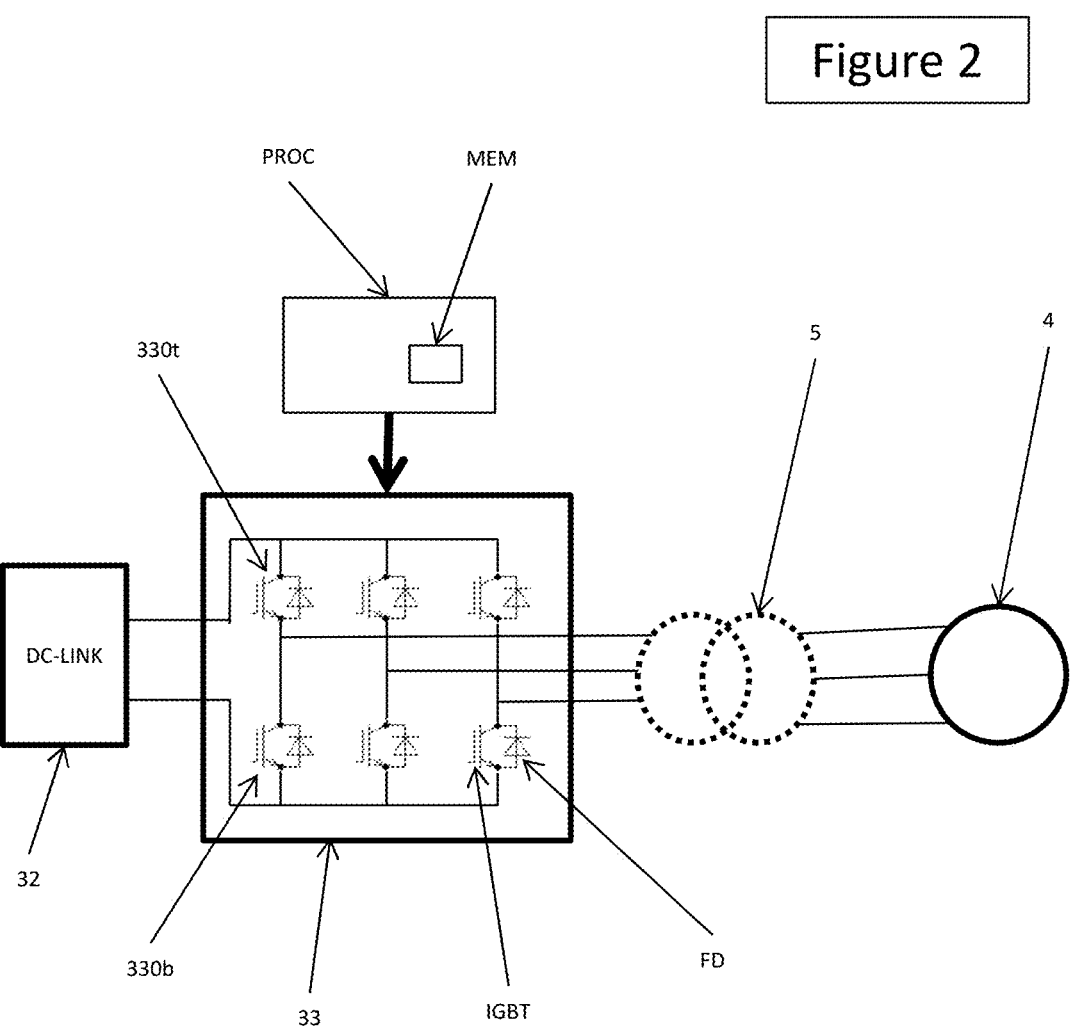
FIG. 2 illustrates a subpart of the electric circuit of FIG. 1.

The inverter 33 is intended to cut off the voltage supplied by the DC-link into a variable voltage to control the electric motor 4. A subpart of the electric circuit 1 illustrating more precisely an example of inverter 33 is illustrated in FIG. 2.

The inverter 33 comprises 3 legs. Each leg is connected on one side to a positive bus of the significantly continuous voltage and on another side to a negative bus of the significantly continuous voltage.

The inverter 33 comprises 6 switches 330. Each leg of the inverter comprises a top switch 330t and a bottom switch 330b. A connection between a leg and a winding of the electric motor 4 is located between the top switch 330t and the bottom switch 330b as illustrated in FIG. 2. Top and bottom are used here to differentiate two switches in the illustrated example and may not necessarily imply that such switches are effectively in a top/bottom configuration.

Each switch 330 comprises two components. A first component is an Insulated Gate Bipolar Transistor, IGBT, and a second component is a freewheeling diode FD connected in parallel with the IGBT.

The inverter 33 and in particular its IGBTs are controlled by a pulse width modulation, PWM, controller PROC by implementing PWM (Pulse Width Modulation) signals based on a control law of the electric motor. The control law performed by the PWM controller PROC makes it possible to determine the voltage to be applied to the output phases intended to be connected to the electric motor 4 to be controlled.

The PWM controller PROC may for example correspond to a microcontroller, to a digital signal processor, DSP or to a digital signal controller, DSC. The DSC combines features of the microcontroller and of the DSP.

The variable speed drive 3 may comprise a non-transitory machine-readable or computer-readable storage medium, such as, for example, a memory or storage unit MEM, whereby the non-transitory machine-readable storage medium is encoded with instructions executable by a controller such as the PWM controller. The machine-readable storage medium may comprise instructions to operate a PWM controller or another controller to implement a method for controlling a variable speed drive driving a three-phase electric motor. Examples of methods for controlling a variable speed drive driving a three-phase electric motor will be described later in the application.

A computer-readable storage according to this disclosure may be any electronic, magnetic, optical or other physical storage device that stores executable instructions. The computer readable storage may be, for example, Random Access Memory (RAM), an Electrically Erasable Programmable Read Only Memory (EEPROM), a storage drive, and optical disk, and the like. As described hereby, the computer-readable storage may be encoded with executable instructions according to operate a method for controlling a variable speed drive 3 driving a three-phase electric motor 4. Storage or memory may include any electronic, magnetic, optical or other physical storage device that stores executable instructions as described hereby.

The variable speed drive may also comprise electric measuring means (not shown) adapted to measure current signals in each of the windings of the electric motor 4. Measuring means may for example correspond to a current observer.

A current observer corresponds to a unit adapted to measure the current signals in the windings of the electric motor and to process the measured current signals for estimating components of the measured current signals.

In some examples, and as illustrated in FIGS. 1 and 2, the electric circuit may comprise a transformer 5 disposed between the variable speed drive 3 and the electric motor 4. In these examples, the variable speed drive drives the electric motor 4 through the transformer 5.

An example method 100 for controlling the variable speed drive 3 driving the electric motor 4 is described below with reference to FIG. 3. The method can be implemented by a processing system comprising the variable speed drive 3 and the PWM controller PROC.

Figure 3:
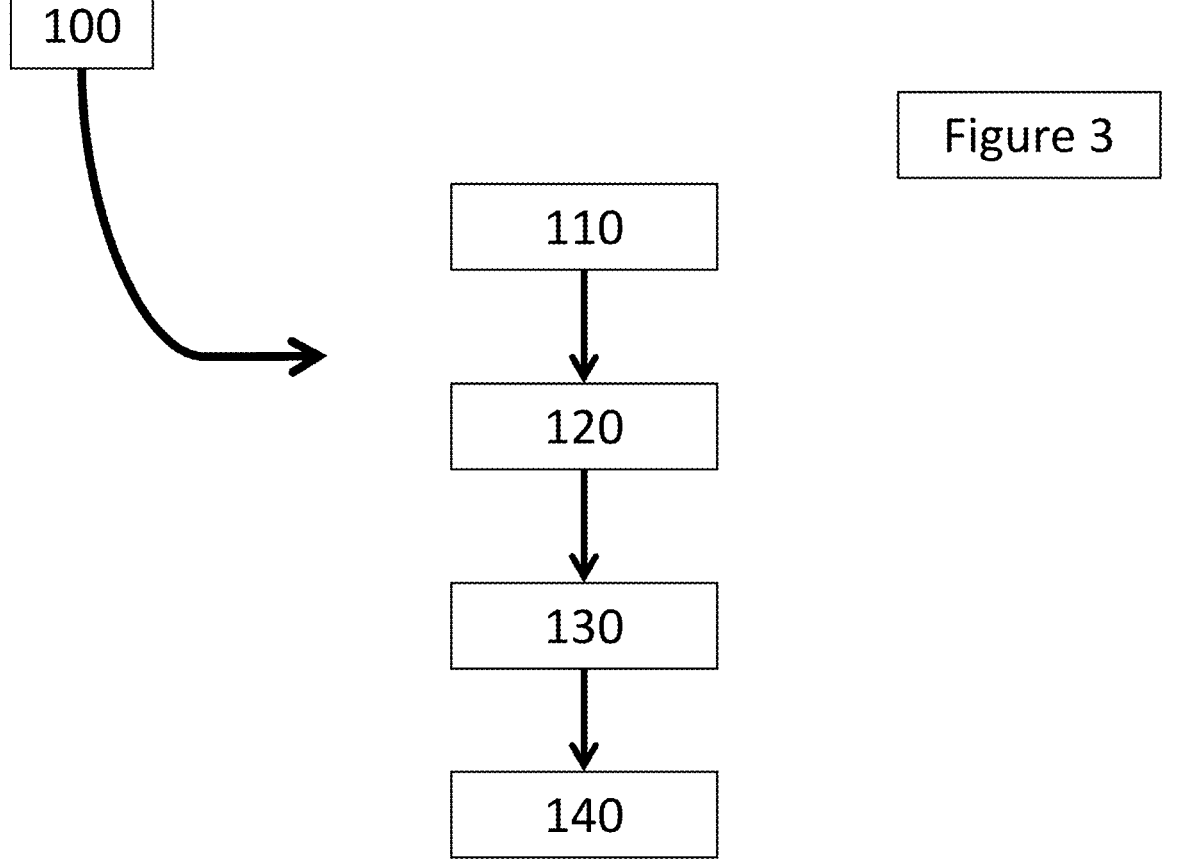
FIG. 3 an example of method for controlling a variable speed drive.

As illustrated in FIG. 3, the method 100 comprises an operation 110 of measuring current signals in the windings of the electric motor 4. The current signals of each of the windings can be measured during a predetermined time window. The current signals can be measured by the current observer.

As illustrated in FIG. 3, the method 100 comprises an operation 120 of determining a current parameter associated to the electric motor based on the current signal.

The current parameter associated to the electric motor comprises:
  a current offset of at least one winding, preferably all the windings, of the electric motor 4 in relation to a zero-current value; or
  a current misbalance between windings of the electric motor.

A current misbalance may comprise at least one of an amplitude misbalance of currents or a phase misbalance of currents.

The amplitude misbalance of currents corresponds to the fact that the three windings of an electric motor 4 may not have the exact same amplitude of current in each of the windings of the electric motor 4.

The phase misbalance of currents corresponds to the fact that an exact same dephasing of $2\pi/3$ may not be applied between each of the currents flowing through the windings of the electric motor 4.

As illustrated in FIG. 3, the method 100 comprises an operation 130 of determining an amended control law of the electric motor for decreasing the determined current parameter.

As illustrated in FIG. 3, the method 100 comprises an operation 140 of applying PWM signals on the IGBTs of the inverter 33 based on the amended control law.

The PWM signals applied based on an amended control law therefore allows reducing a current offset in relation to a zero-current of at least one winding of the electric motor or reducing a current misbalance between the windings of the electric motor.

Reducing a current offset in relation to a zero-current value in a specific winding of an electric motor 4 allows reducing inductance saturation probability of the specific winding of the electric motor 4.

Reducing a current misbalance between the windings of the electric motor 4 allows mitigating the electric motor overheating and therefore reducing the electrical and/or mechanical damages induced by an undesired overheating. Reducing a current misbalance between the windings of the electric motor also allows reducing the voltage misbalance between the windings of the electric motor, and therefore allows reducing the torque ripple of the electric motor.

Usually, the control law of an electric motor is computed for balancing the voltages applied by the variable speed drive to the windings of the electric motor 4. However, the voltages applied to the windings are generally in the order of magnitude of several hundreds of volts while the internal resistance of the windings is as low as possible to avoid power losses. Hence, few millivolts of misbalance between the applied voltages leads to significant current misbalance between the windings of the electric motor. That is, if the voltages applied by the variable speed drive 3 to the windings of the electric motor 4 are not perfectly balanced, the current misbalance induces by the voltage misbalance may be important, which may cause serious electrical and/or mechanical damage to the electric motor.

Even when the voltages applied by the variable speed drive 3 to the windings of the electric motor 4 are perfectly balanced, the intrinsic characteristics of each winding of the electric motor, since they are not exactly similar, in particular concerning their own internal resistance, induce a misbalance between the currents in each winding. Although current misbalance in this case would be reduced in comparison with the one induced by voltage misbalance applied by the variable speed drive, the current misbalance due to the intrinsic characteristics of the electric motor may still cause damage to the electric motor 4.

The method 100 goes against the traditional practice by determining an amended control law reducing the current offset in at least one winding of the electric motor or reducing the current misbalance between the windings of the electric motor, for reducing the probability of damage to the electric motor. Indeed, the method 100 modifies the control law for directly reducing the determined current parameter which may correspond to an offset or a misbalance issue of the measured current signals in the windings of the electric motor 4. Hence, the method allows reducing the impact of the current issues in the windings of the electric motor regardless of the intrinsic characteristics of the electric motor and thereby reducing the electric motor aging.

In some examples, the operation 120 of determining a current parameter comprises determining:
  a current offset of at least one winding, preferably all the windings, of the electric motor 4 in relation to a zero-current value; and
  a current misbalance between the windings of the electric motor 4.

In these examples, the method allows both reducing inductance saturation probability in the windings of the electric motor and mitigating electric motor overheating.
Determining a Current Offset:

In some examples wherein the current parameter comprises a current offset of a specific winding of the electric motor 4, determining a current offset of the specific winding comprises determining an average value of the current signal of the specific winding. Indeed, when the current signal flowing through the specific winding of the electric motor 4 is equilibrated in terms of amplitude, the average value of the current signal is equal to 0.

In some examples, determining a current offset of a specific winding of the electric motor 4 comprises applying a digital low-pass filter on the measured current signal of the specific winding of the electric motor. Indeed, the digital low-pass filter will attenuate the alternating components of the current signal and will therefore preserve the direct component of the current signal, which corresponds to the current offset of the specific winding. The cut-frequency and the time constant of the digital low-pass filter should, however, be carefully chosen since the frequency applied by the variable speed drive is variable.

In some examples, the digital low-pass filter corresponds to a first-order low pass filter and the time constant is greater than 4 seconds.

The current offset of each winding of the electric motor 4 can be determined based on the same principle.

Determining a Current Misbalance:

In some examples, determining a current misbalance between the windings of the electric motor can be determined based on a Fortescue transformation of the measured current signals. In these examples, the current misbalance between the windings of the electric motor corresponds to a reverse component of the Fortescue transformation.

A representation of the measured current signals, determined based on the Fortescue transformation, can correspond to the following equation (1):

$$I_{abc} = I_{abc}^0 + I_{abc}^f e^{j\theta} + I_{abc}^r e^{-j\theta} \tag{1}$$

wherein $I_{abc}$ correspond to the measured current signals in the three windings (a, b, c) of the electric motor, wherein $$I_{abc}^0$$

corresponds to the direct current component of the measured current signals $I_{abc}$ in the three windings (a, b, c) of the electric motor, wherein $\theta$ corresponds to the current vector angle in abc frame, wherein $$I_{abc}^f e^{j\theta}$$

corresponds to the forward component of the measured current signals in the three windings (a, b, c) of the electric motor, and wherein $$I_{abc}^r e^{-j\theta}$$

corresponds to the reverse component of the measured current signals in the three windings (a, b, c) of the electric motor.

That is, the misbalance between the windings of the electric motor 4 can be obtained by determining the reverse component $$I_{abc}^r e^{j\theta}$$

of the measured current signals $I_{abc}$ in the three windings (a, b, c) of the electric motor.

Based on the equation (1), it can be determined the following equation (2):

$$I_{abc}^1 = I_{abc} - I_{abc}^0 = I_{abc}^f e^{j\theta} + I_{abc}^r e^{-j\theta} \tag{2}$$

wherein $I_{abc}$ correspond to the measured current signals in the three windings (a, b, c) of the electric motor, wherein $$I_{abc}^0$$

corresponds to the direct current component of the measured current signals $I_{abc}$ in the three windings (a, b, c) of the electric motor, wherein $\theta$ corresponds to the current vector angle in abc frame, wherein $$I_{abc}^f e^{j\theta}$$

corresponds to the forward component of the measured current signals $I_{abc}$ in the three windings (a, b, c) of the electric motor, wherein $$I_{abc}^r e^{-j\theta}$$

corresponds to the reverse component of the measured current signals $I_{abc}$ in the three windings (a, b, c) of the electric motor, and wherein $$I_{abc}^1$$

corresponds to the centered current signals in the three windings (a, b, c) of the electric motor.

A centered current signal corresponds to a current signal of a winding of the electric motor centered around the zero-current value. The centered current signals $$I_{abc}^1$$

are obtained by removing the direct current components $$I_{abc}^0$$

of the measured current signals $I_{abc}$, which therefore allow obtaining a signal consisting of the forward $$I_{abc}^f e^{j\theta}$$

and reverse $$I_{abc}^r e^{-j\theta}$$

components of the measured current signals $I_{abc}$ in abc frame.

In some examples, determining a current misbalance between windings of the electric motor comprises:

determining the current offsets of the current signals in the windings of the electric motor;

removing the current offsets from the current signals for obtaining centered current signals; and determining a reverse component of the measured current signals based on the current observer and on the centered current signals.

Remove the current offsets from the current signals corresponds to remove the direct current components $$I_{abc}^0$$

of the measured current signals $I_{abc}$, which therefore permits obtaining the centered current signals.

In these examples, the centered current signals can be defined in the current observer as the following equation (3):

$$\hat{I}_{\alpha\beta}^1 = \hat{I}^f e^{j\theta} + \left(\hat{I}_1^r + j\hat{I}_2^r\right) e^{-j\theta} \tag{3}$$

wherein $$\hat{I}_{\alpha\beta}^1$$

corresponds to an estimation of the centered current signals $$I_{abc}^1$$

in the Clarke representation, wherein $\theta$ corresponds to an estimation of the current vector angle in alpha-beta frame (hereinafter designated by $\alpha\beta$ frame), wherein $I^f e^{j\theta}$ corresponds to an estimation of the forward component of the measured current signals, wherein $$\left(\hat{I}_1^r + j\hat{I}_2^r\right) e^{-j\theta}$$

corresponds to an estimation of the reverse component of the measured current signals, wherein $$\hat{I}_1^r$$

corresponds to an estimation of the real part of the reverse component of the measured current signals, and wherein $$\hat{I}_2^r$$

corresponds to an estimation of the imaginary part of the reverse component of the measured current signals.

Equation (3) can therefore be obtained by applying the Clarke transformation to the equation (2) and by decomposing the reverse component $$I_{\alpha\beta}^r e^{-j\theta}$$

in $\alpha\beta$ frame of the measured current signals into a real part $$I_1^r$$

and an imaginary part $$jI_2^r.$$

Here, determining the reverse component of the measured current signals comprises determining the estimated real part $$\hat{I}_1^r$$

and imaginary part $$\hat{I}_2^r$$

of the reverse component $$I_{\alpha\beta}^r e^{-j\theta}$$

in $\alpha\beta$ frame of the measured current signals. The amended control law may therefore be determined for reducing, preferably canceling, the estimated real part $$\hat{I}_1^r$$

and imaginary part $$j\hat{I}_2^r$$

of the reverse component $$\hat{I}_{\alpha\beta}^r$$

of the measured current signals in $\alpha\beta$ frame.

In some examples, the current vector angle $\hat{\theta}$ in $\alpha\beta$ frame is determined based on a Phase-Locked Loop, PLL. In other examples, the current vector angle $\hat{\theta}$ in $\alpha\beta$ frame is determined based on the magnetic flux vector angle of the electric motor determined by the variable speed drive 3.

In some examples, the estimated real part $$\hat{I}_1^r$$

and imaginary part $$j\hat{I}_2^r$$

of the reverse component of the measured current signals are estimated based on the following equation (4):

$$\frac{d}{dt}\begin{pmatrix} \hat{I}_{\alpha\beta}^f \\ \hat{I}_1^r \\ \hat{I}_2^r \end{pmatrix} = \tag{4}$$

$$K_p\left[\begin{pmatrix} \cos\hat{\theta} & \sin\hat{\theta} \\ \cos\hat{\theta} & -\sin\hat{\theta} \\ \sin\hat{\theta} & \cos\hat{\theta} \end{pmatrix}\begin{pmatrix} I_\alpha \\ I_\beta \end{pmatrix} - \begin{pmatrix} 1 & \cos(2\hat{\theta}) & \sin(2\hat{\theta}) \\ \cos(2\hat{\theta}) & 1 & 0 \\ \sin(2\hat{\theta}) & 0 & 1 \end{pmatrix}\begin{pmatrix} \hat{I}_{\alpha\beta}^f \\ \hat{I}_1^r \\ \hat{I}_2^r \end{pmatrix}\right]$$

wherein $$\hat{I}_{\alpha\beta}^f$$

corresponds to an estimation of the forward component of the measured current signals in the Clarke representation,
wherein $$\hat{I}_1^r$$

corresponds to an estimation of the real part of the reverse component of the measured current signals,
wherein $$\hat{I}_2^r$$

corresponds to an estimation of the imaginary part of the reverse component of the measured current signals,
wherein $K_p = 2\pi f_0$ with $f_0$ being the selected gain frequency,
wherein $\hat{\theta}$ corresponds to an estimation of the current vector angle in $\alpha\beta$ frame,
wherein $I_\alpha$ corresponds to the first component of the current in the Clarke representation determined based on the measured current signals in the windings, and
wherein $I_\beta$ corresponds to the second component of the current in the Clarke representation determined based on the measured current signals in the windings.

Equation (4) is therefore an equation allowing the current observer to identify the real part $$\hat{I}_1^r$$

and imaginary part $$j\hat{I}_2^r$$

of the reverse component $$I_{\alpha\beta}^r e^{-j\theta}$$

of the measured current signals $I_{abc}$ based on the first $I_\alpha$ and second $I_\beta$ components of the current in the Clarke representation. As explained above, these components can be determined based on the measured current signals $I_{abc}$ in the windings of the electric motor 4. Equation (4) also allows identifying the forward component $$I_{\alpha\beta}^f e^{j\theta}$$

of the measured current signals $I_{abc}$ based on the first $I_\alpha$ and second components $I_\beta$ of the current in the Clarke representation.

In some examples, the operation of determining 130 an amended control law comprises determining a proportional factor and an integral factor of a proportional-integer, PI, regulator for canceling the determined current parameter.

In some examples wherein the current parameter comprising the real part $$\hat{I}_1^r$$

and imaginary part $$j\hat{I}_2^r$$

of the reverse component $$I_{\alpha\beta}^r e^{-j\theta}$$

of the measured current signals, the operation of determining 130 an amended control law comprises:
determining a first pair of factors (kp1, ki1) comprising a first proportional factor kp1 and a first integral factor ki1 of a PI regulator for reducing, preferably canceling, the real part $$\hat{I}_1^r$$

of the reverse component $$I_{\alpha\beta}^{f} e^{j\theta};$$

and determining a second pair of factors (kp2, ki2) comprising a second proportional factor kp2 and a second integral factor ki2 of a PI regulator for reducing, preferably canceling, the imaginary part $$\hat{I}_{2}^{r}$$

of the reverse component $$I_{\alpha\beta}^{r} e^{-j\theta}.$$

In some examples wherein the current parameter comprising a current offset of a specifying winding, the operation of determining 130 an amended control law comprises:
   determining a first pair of factors (kp, ki) comprising a proportional factor kp and an integral factor of a PI regulator for reducing, preferably canceling, the current offset of the specific winding.

When the current parameter comprises a current offset of each winding of the electric motor 4, a pair of factors is determined for each winding for reducing, preferably canceling, the current offset of its associated winding.

An example of motor control function implemented according to the present disclosure is now described with reference to FIG. 4. The example of motor control function is implemented by different components of the variable speed drive 3, in particular by the PWM controller and the inverter 32.

The example of motor control function comprises a control function Ctl configured to determine a control law. The control law defines three references of voltage signals, illustrated as Uabc_ref in the figure, based on the measured current signals $I_{abc}$ in the windings of the electric motor. Each reference of voltage signal is associated to a specific winding of the electric motor 4. The control law may be determined to define a speed, a position, and/or a torque of the electric motor 4. The control function Ctl can be implemented by the PWM controller PROC or by another controller of the variable speed drive 3.

The example of motor control function comprises an offset estimation function $Est_{of}$ configured to determine the current offsets $$I_{abc}^{0}$$

of the measured current signals $I_{abc}$. Some examples have been presented above allowing to determine the current offsets $$I_{abc}^{0}$$

of the measured current signals. The offset estimation function $Est_{of}$ can be implemented by the PWM controller PROC or by another controller of the variable speed drive 3.

The example of motor control function comprises a misbalance estimation function $Est_{mis}$ configured to determine an estimation of the forward $$\hat{I}_{\alpha\beta}^{f}$$

and reverse $$\hat{I}_{\alpha\beta}^{r}$$

components of the measured current signals in $\alpha\beta$ frame. In the example of motor control function, the forward $$\hat{I}_{\alpha\beta}^{f}$$

and reverse $$\hat{I}_{\alpha\beta}^{r}$$

components of the measured current signals in $\alpha\beta$ frame are determined based on the measured current signals $I_{abc}$ and on the current offsets $$I_{abc}^{0}.$$

The forward $$\hat{I}_{\alpha\beta}^{f}$$

and reverse $$\hat{I}_{\alpha\beta}^{r}$$

components of the measured current signals may for example be determined based on equation (4) as explained above. The misbalance estimation function $Est_{mis}$ can be implemented by the PWM controller PROC or by another controller of the variable speed drive 3.

The example of motor control function comprises a correction function Cor. As illustrated in the FIG. 4, the three references Uabc_ref of voltage, the current offsets $$I_{abc}^{0}$$

of the measured current signals and an estimation of the forward $$\hat{I}_{\alpha\beta}^{f}$$

US 12,620,923 B2

17                                                                        18 and reverse $$\hat{I}_{\alpha\beta}^{r}$$

components of the measured current signals in $\alpha\beta$ frame are inputted into the correction function Cor. The correction function Cor is configured to determine an amended control law Uabc_cor based on the three references Uabc_ref of voltage, on the current offsets $$I_{abc}^{0}$$

of the measured current signals $I_{abc}$, and on the forward $$\hat{I}_{\alpha\beta}^{f}$$

and reverse $$\hat{I}_{\alpha\beta}^{r}$$

components of the measured current signals. The correction function Cor can be implemented by the PWM controller PROC or by another controller of the variable speed drive 3.

The example of motor control function comprises a PWM function PWMf. The amended control law Uabc_cor is inputted in the PWM function PWMs. The PWM function PWMf is configured to determine PWM signals PWMs based on the amended control law Uabc_cor. The PWM function PWMf is implemented by the PWM controller PROC of the variable speed drive 3.

The example of motor control function comprises an inverter function INVf. The PWM function PWMf is inputted in the inverter function INVf. The inverter function INVf is configured to apply three voltages Uabc on the three windings of the electric motor 4 or on the transformer 5 if applicable, based on the PWM signals. The inverter function INVF is implemented by the inverter 32 of the variable speed drive 3.

Figure 4:
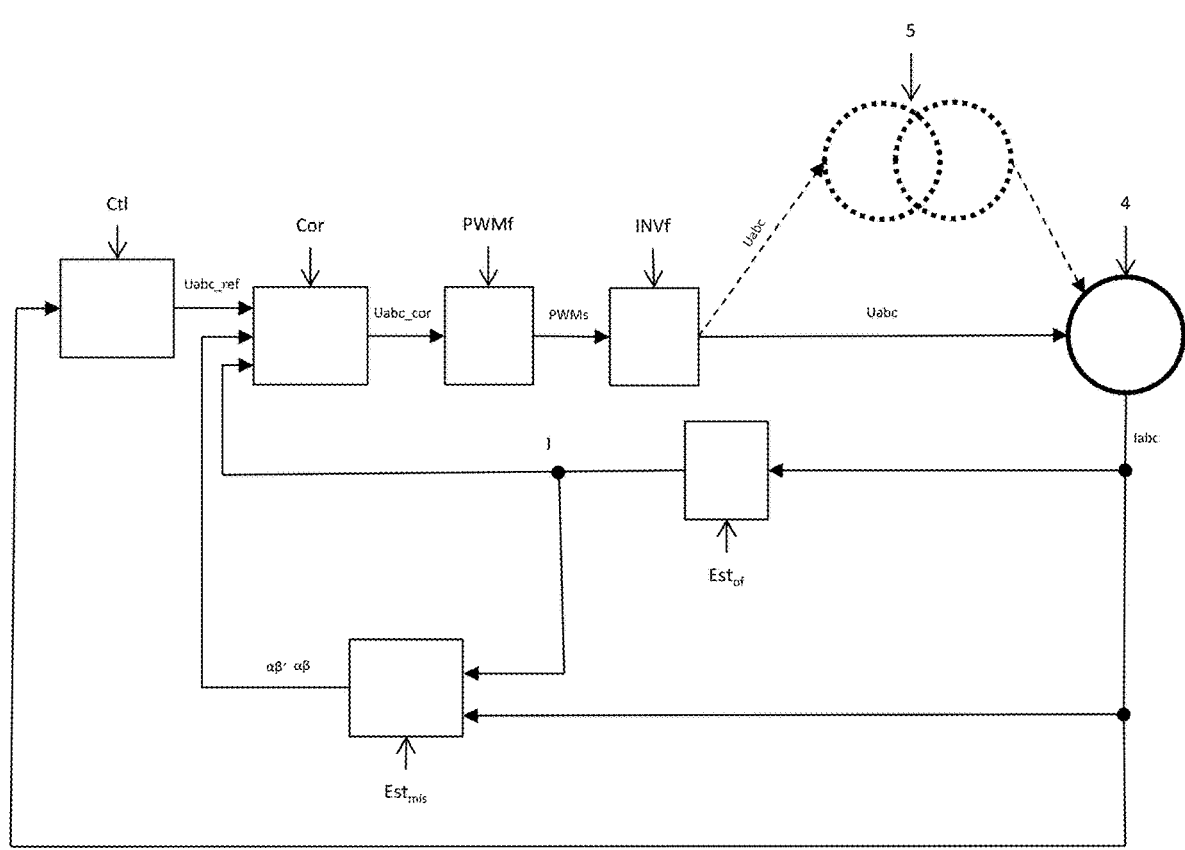
FIG. 4 illustrates an example of motor control function.
Figure 5:
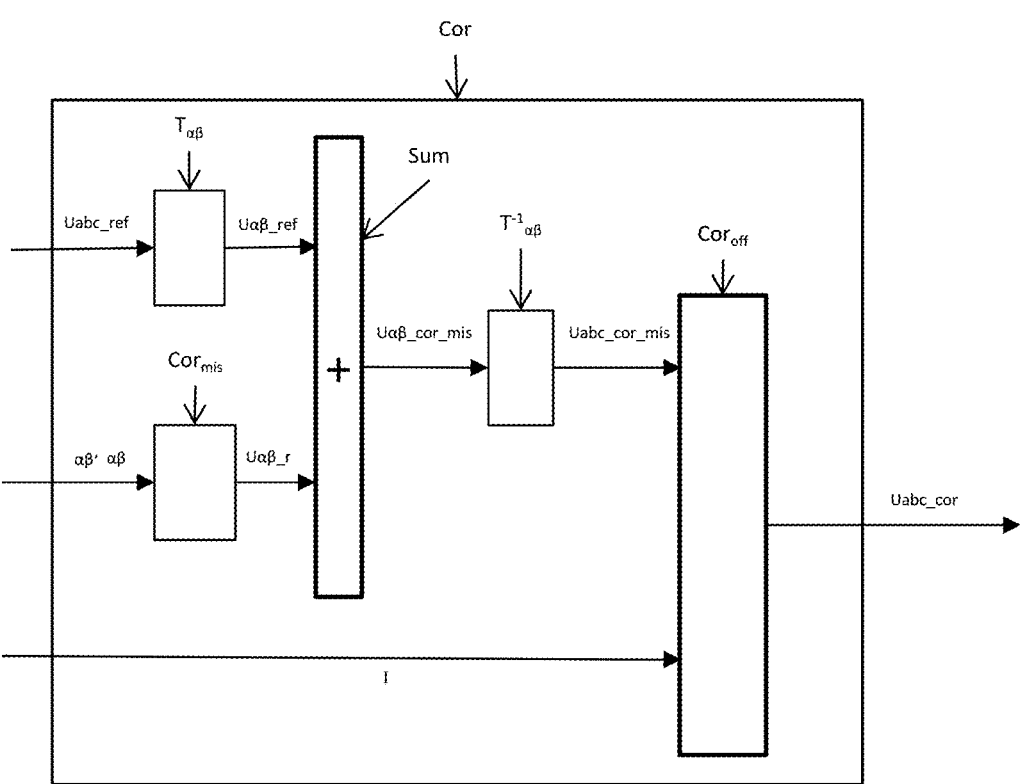
FIG. 5 illustrates an example of correction function of a motor control function.

An example of correction function Cor which may be used in the example of motor control function of FIG. 4 is now described in reference to FIG. 5.

The example of correction function Cor comprises an alpha-beta transformer function $T_{\alpha\beta}$ in which the three references Uabc_ref of voltage are inputted. The alpha-beta transformer function $T_{\alpha\beta}$ is configured to transform the three references Uabc_ref of voltage in abc frame in two stationary references of voltage U$\alpha\beta$_ref in $\alpha\beta$ frame by applying a Clarke transformation.

The example of correction function Cor comprises a misbalance correction function $Cor_{mis}$ in which an estimation of the forward $$\hat{I}_{\alpha\beta}^{f}$$

and reverse $$\hat{I}_{\alpha\beta}^{r}$$

components of the measured current signals are inputted. The misbalance correction function $Cor_{mis}$ is configured to determine a reverse reference voltage U$\alpha\beta$_r in $\alpha\beta$ frame for reducing, preferably canceling, the estimation of the reverse $$\hat{I}_{\alpha\beta}^{r}$$

component of the measured current signals when summed to the two stationary references of voltage U$\alpha\beta$_ref.

The example of correction function Cor comprises a summer function Sum. The two references of voltage U$\alpha\beta$_ref and the reverse reference voltage U$\alpha\beta$_r in $\alpha\beta$ frame are inputted in the summer function Sum. The summer function is configured to determine a misbalance correction reference in $\alpha\beta$ frame U$\alpha\beta$_cor_mis by summing two references of voltage U$\alpha\beta$_ref and the reverse reference voltage U$\alpha\beta$_r in $\alpha\beta$ frame.

The example of correction function Cor comprises an inverse alpha-beta transformer function $T^{-1}_{\alpha\beta}$ in which the misbalance correction reference in $\alpha\beta$ frame U$\alpha\beta$_cor_mis is inputted. The inverse alpha-beta transformer function $T^{-1}_{\alpha\beta}$ is configured to determine a misbalance correction reference in abc frame Uabc_cor_mis by transforming the misbalance correction reference from $\alpha\beta$ frame to abc frame.

The example of correction function Cor comprises an offset correction function $Cor_{of}$ in which the misbalance correction reference in abc frame Uabc_cor_mis and current offsets $$I_{abc}^{0}$$

of the measured current signals are inputted. The offset correction function $Cor_{of}$ is configured to determine an amended control law Uabc_cor for reducing, preferably canceling, the offset currents $$I_{abc}^{0}$$

of the misbalance correction reference in abc frame Uabc_cor_mis. The offset correction function $Cor_{of}$ acts on abc frame since the current offsets are directly determined in the abc frame.

The amended control law Uabc_cor outputted from the offset correction function $Cor_{of}$ therefore at least reduces and preferably cancels the misbalance and offsets of the current between the three windings of the electric motor 4.

The example method and example of motor control function according to the present disclosure therefore allow at least reducing inductance saturation probability of a specific winding of the electric motor 4, or reducing the torque ripple of the electric motor and the electrical and/or mechanical damages induced by an undesired overheating, and therefore allow reducing the component aging of the electric motor 4.

The invention claimed is:

1. A method for controlling a variable speed drive driving a three-phase electric motor, the variable speed drive comprising a pulse width modulation (PWM) controller, an inverter, and a DC-link adapted to supply the inverter with a significantly continuous voltage, wherein:

the inverter comprises three legs connected to three windings of the electric motor, each of the three legs being connected on a first side to a positive bus of the significantly continuous voltage and on a second side to a negative bus of the significantly continuous voltage, each of the three legs comprising a top switch and a bottom switch; wherein each of the top switch and the bottom switch comprises two components, a first component being an Insulated Gate Bipolar Transistor (IGBT) controlled by a PWM signal output by the PWM controller based on a control law of the electric motor, and a second component being a freewheeling diode connected in parallel with the IGBT; and the method comprising:

measuring current signals in the three windings of the electric motor;

determining a current parameter associated with the electric motor based on the current signals, wherein the current parameter comprises a current offset of at least one of the three windings of the electric motor in relation to a zero-current value; or wherein the current parameter comprises a current misbalance between at least two windings of the electric motor;

determining an amended control law of the electric motor for decreasing the current parameter, wherein the determining comprises determining a proportional factor and an integral factor of a proportional-integer (PI) regulator for canceling the current parameter; and outputting PWM signals to at least one of the IGBTs based on the amended control law.

2. The method according to claim 1, wherein determining the current parameter comprises determining the current offset and the current misbalance.

3. The method according to claim 2, wherein determining the current misbalance comprises:

determining current offsets of the current signals in the windings of the electric motor;

removing the current offsets from the current signals for obtaining centered current signals; and determining a reverse component of the measured current signals based on a current observer and on the centered current signals.

4. The method according to claim 3, wherein the centered current signals are defined in the current observer as:

$$\hat{I}_{\alpha\beta}^{1} = \hat{I}^{f} e^{j\hat{\theta}} + (\hat{I}_{1}^{r} + j\hat{I}_{2}^{r})e^{-j\hat{\theta}}$$

wherein $$\hat{I}_{\alpha\beta}^{1}$$

corresponds to an estimation of the centered current signals I $$I\frac{1}{abc}$$

in the Clarke representation, wherein $\hat{\theta}$ corresponds to an estimation of the current vector angle in $\alpha\beta$ frame, wherein $\hat{I}^{f} e^{j\hat{\theta}}$ corresponds to an estimation of the forward component of the measured current signals, wherein $$(\hat{I}_{1}^{r} + j\hat{I}_{2}^{r})e^{-j\hat{\theta}}$$

corresponds to an estimation of the reverse component of the measured current signals, wherein $$\hat{I}_{1}^{r}$$

corresponds to an estimation of the real part of the reverse component of the measured current signals, and wherein $$\hat{I}_{2}^{r}$$

corresponds to an estimation of the imaginary part of the reverse component of the measured current signals;

wherein determining the reverse component of the measured current signals comprises determining the estimated real part $$\hat{I}_{1}^{r}$$

and imaginary part $$\hat{I}_{2}^{r}$$

of the reverse component of the measured current signals; and wherein the amended control law of the electric motor is determined for decreasing the estimated real part $$\hat{I}_{1}^{r}$$

and imaginary part $$\hat{I}_{2}^{r}$$

of the reverse component of the measured current signals.

5. The method according to claim 4, wherein the current vector angle $\hat{\theta}$ in $\alpha\beta$ frame is estimated based on a Phase-Locked Loop (PLL) or is determined based on a magnetic flux vector angle of the electric motor determined by the variable speed drive.

6. The method according to claim 4, wherein the estimated real part $$\hat{I}_{1}^{r}$$

and imaginary part $$\hat{I}_2^r$$

of the reverse component of the measured current signals $$\hat{I}_{\alpha\beta}^1$$

are estimated based on the following equation:

$$\frac{d}{dt}\begin{pmatrix}\hat{I}_{\alpha\beta}^f \\ \hat{I}_1^r \\ \hat{I}_2^r\end{pmatrix} =$$

$$K_p\left(\begin{pmatrix}\cos\hat{\theta} & \sin\hat{\theta} \\ \cos\hat{\theta} & -\sin\hat{\theta} \\ \sin\hat{\theta} & \cos\hat{\theta}\end{pmatrix}\begin{pmatrix}I_\alpha \\ I_\beta\end{pmatrix} - \begin{pmatrix}1 & \cos(2\hat{\theta}) & \sin(2\hat{\theta}) \\ \cos(2\hat{\theta}) & 1 & 0 \\ \sin(2\hat{\theta}) & 0 & 1\end{pmatrix}\begin{pmatrix}\hat{I}_{\alpha\beta}^f \\ \hat{I}_1^r \\ \hat{I}_2^r\end{pmatrix}\right)$$

wherein $$\hat{I}_{\alpha\beta}^1$$

corresponds to an estimation of the forward component of the measured current signals in the Clarke representation,
wherein $$\hat{I}_1^r$$

corresponds to an estimation of the real part of the reverse component of the measured current signals,
wherein $$\hat{I}_2^r$$

corresponds to an estimation of the imaginary part of the reverse component of the measured current signals, wherein $K_p = 2\pi f_0$ with $f_0$ being the selected gain frequency,
wherein $\hat{\theta}$ corresponds to an estimation of the current vector angle in $\alpha\beta$ frame,
wherein $I\alpha$ corresponds to a first component of the current in the Clarke representation determined based on the measured current signals in the windings, and
wherein $I\beta$ corresponds to a second component of the current in the Clarke representation determined based on the measured current signals in the windings.

7. The method according to claim 1, wherein the current offset of the at least one of the three windings comprises a respective current offset for each of the three windings of the electric motor.

8. The method according to claim 1, wherein the current offset of the at least one of three windings comprises a current offset of a specific winding of the electric motor, and the method further comprising determining the current offset of the specific winding by determining an average value of the current signal of the specific winding.

9. The method according to claim 1, wherein the current offset comprises a current offset of a specific winding of the electric motor, and the method further comprising determining the current offset of the specific winding by applying a digital low-pass filter on the measured current signal of the specific winding of the electric motor.

10. The method according to claim 1, wherein a transformer is disposed between the variable speed drive and the electric motor such that the variable speed drive drives the electric motor through the transformer.

11. A non-transitory computer-readable storage medium comprising instructions which, when executed by at least one hardware processor, cause the at least one hardware processor to perform a method for controlling a variable speed drive driving a three-phase electric motor, the variable speed drive comprising a pulse width modulation (PWM) controller, an inverter, and a DC-link adapted to supply the inverter with a significantly continuous voltage, wherein:

the inverter comprises three legs connected to three windings of the electric motor, each of the three legs being connected on a first side to a positive bus of the significantly continuous voltage and on a second side to a negative bus of the significantly continuous voltage, each of the three legs comprising a top switch and a bottom switch; wherein each of the top switch and the bottom switch comprises two components, a first component being an Insulated Gate Bipolar Transistor (IGBT) controlled by a PWM signal output by the PWM controller based on a control law of the electric motor, and a second component being a freewheeling diode connected in parallel with the IGBT; and the method comprising:

measuring current signals in the three windings of the electric motor;

determining a current parameter associated with the electric motor based on the current signals, wherein the current parameter comprises a current offset of at least one of the three windings of the electric motor in relation to a zero-current value; or wherein the current parameter comprises a current misbalance between at least two windings of the electric motor;

determining an amended control law of the electric motor for decreasing the current parameter, wherein the determining comprises determining a proportional factor and an integral factor of a proportional-integer (PI) regulator for canceling the current parameter; and outputting PWM signals to at least one of the IGBTs based on the amended control law.

12. The non-transitory computer-readable storage medium according to claim 11, the method further comprising determining the current misbalance by:

determining current offsets of the current signals in the windings of the electric motor;

removing the current offsets from the current signals for obtaining centered current signals; and determining a reverse component of the measured current signals based on a current observer and on the centered current signals.

13. The non-transitory computer-readable storage medium according to claim 11, wherein the current offset of the at least one of three windings comprises a current offset of a specific winding of the electric motor, and the method further comprising determining the current offset of the specific winding by determining an average value of the current signal of the specific winding.

14. The non-transitory computer-readable storage medium according to claim 11, wherein the current offset comprises a current offset of a specific winding of the electric motor, and the method further comprising determining the current offset of the specific winding by applying a digital low-pass filter on the measured current signal of the specific winding of the electric motor.

15. A system comprising:
a variable speed drive configured to drive a three-phase electric motor having three windings;
an inverter comprising three legs connected to the three windings of the electric motor, each of the three legs being connected on a first side to a positive bus of a significantly continuous voltage and on a second side to a negative bus of the significantly continuous voltage, each of the three legs comprising a top switch and a bottom switch, each of the top switch and the bottom switch comprises two components, a first component being an Insulated Gate Bipolar Transistor (IGBT) controlled by a pulse width modulation (PWM) signal output by a PWM controller based on a control law of the electric motor, and a second component being a freewheeling diode connected in parallel with the IGBT;
a DC-link adapted to supply the inverter with the significantly continuous voltage; and the PWM controller configured to execute a method comprising:
measuring current signals in the three windings of the electric motor;
determining a current parameter associated with the electric motor based on the current signals,
wherein the current parameter comprises a current offset of at least one of the three windings of the electric motor in relation to a zero-current value; or
wherein the current parameter comprises a current misbalance between at least two windings of the electric motor;
determining an amended control law of the electric motor for decreasing the current parameter, wherein the determining comprises determining a proportional factor and an integral factor of a proportional-integer (PI) regulator for canceling the current parameter; and
outputting PWM signals to at least one of the IGBTs based on the amended control law.

16. The system according to claim 15, the method further comprising determining the current misbalance by:
determining current offsets of the current signals in the windings of the electric motor;
removing the current offsets from the current signals for obtaining centered current signals; and
determining a reverse component of the measured current signals based on a current observer and on the centered current signals.

17. The system according to claim 15, further comprising a transformer disposed between the variable speed drive and the electric motor such that the variable speed drive is configured to drive the electric motor through the transformer.

* * * * *